Oct. 16, 1934.     C. A. STYER     1,977,359
METHOD OF ANALYSIS EMPLOYING PHOTOSENSITIVE DEVICES
Filed March 24, 1931

WITNESSES:
P. J. Fitzgerald
Hymen Diamond

INVENTOR
Charles A. Styer.
BY Wesley G. Carr
ATTORNEY

Patented Oct. 16, 1934

1,977,359

UNITED STATES PATENT OFFICE 1,977,359

METHOD OF ANALYSIS EMPLOYING PHOTOSENSITIVE DEVICES

Charles A. Styer, Forest Hills, Pa., assignor to Westinghouse Electric & Manufacturing Company, a corporation of Pennsylvania Application March 24, 1931, Serial No. 524,883

4 Claims. (Cl. 23—230)

My invention relates to photo-sensitive devices and has particular relation to devices of the type utilized in chemical analysis.

It is an object of my invention to provide a photo-sensitive device particularly adapted to analyze a fluid, relative to predetermined constituents combined therein.

A further object of my invention is to provide apparatus for analyzing a fluid comprising a plurality of constituents, certain of which only are of interest.

A further object of my invention is to provide a method for detecting the quantity of predetermined constituents present in a fluid.

A specific object of my invention is to provide a method and apparatus for determining the quantity of free chlorine present in a fluid that is semi-transparent.

A further object of my invention is to provide a method and apparatus for analyzing a fluid relative to its alkaline content.

Another specific object of my invention is to provide a method and apparatus for analyzing a fluid relative to its combined content of carbonates, sulphates and dissolved carbon dioxide.

More concisely stated, it is an object of my invention to provide a method and apparatus for analyzing a fluid relative to certain of its predetermined constituents, said fluid being of the type wherein the remainder of the constituents produce an effect vitiating optical analysis.

According to my invention, I provide apparatus comprising a tube adapted to transmit a fluid and an optical system adapted to transmit a plurality of light beams through said tubes. In general, the light beams are transmitted in a direction transverse to the direction of flow of said fluid.

A re-agent capable of modifying the physical property of the constituents of the fluid that are in question is introduced between the paths of the transmitted light beams. As a result, the light beam is, on the one hand, transmitted through the fluid, unaffected by the re-agent, and, on the other hand, it is transmitted through the fluid modified by the re-agent.

The beams transmitted through the fluid impinge on a plurality of devices specifically responsive to optical properties relative to which the fluid and its constituents have a marked effect on a light beam.

In many cases, the re-agent precipitates a solid in the fluid which, in turn, absorbs the light in the beam, and, consequently, the device responsive to the condition of the beam is commonly a device responsive to the energy content thereof. However, a number of re-agents are well known that induce changes in a fluid other than changing its content of solid suspended matter. For example, certain reagents change the color of the fluid while others change its refractive index, its polarization properties or its dispersion properties. These optical properties may all be utilized in analyzing the fluid.

If the color property of the fluid is utilized, the light transmitted through the fluid is ordinarily filtered in accordance with the color produced in the fluid by the re-agent. If the polarization property of the solid is utilized, the beams transmitted through the fluid are ordinarily polarized before transmission and analyzed after transmission. The remaining optical properties of the fluid are utilized in accordance with their characteristics.

The novel feature that I consider characteristic of my invention is set forth with particularity in the appended claims. The invention itself, however, both as to its organization and its method of operation, together with additional objects and advantages thereof, will best be understood from the following description of a specific embodiment, when read in connection with the accompanying drawing, in which:

Figure 1:
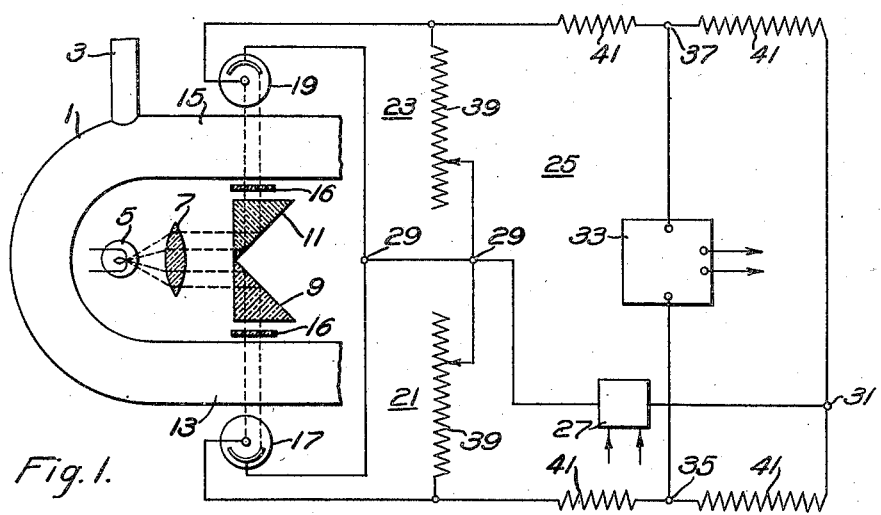
Figure 1 is a schematic view, illustrating a specific embodiment of my invention.

The apparatus illustrated in Fig. 1 comprises a transparent tube 1 through which a fluid is transmitted in a longitudinal direction. The tube is provided with a branch 3 into which a stream of re-agent is introduced. The re-agent is adapted to effect a physical change in the properties of the constituents of the fluid that are under observation.

Numerous examples of chemical constituents and their re-agents are available. The apparatus shown in Fig. 1 is particularly adapted to analyze a liquid for its content of dissolved matter and has wide application in the analysis of a fluid for its alkaline content by titration, for example. In such case, phenol-thalein may be introduced through the branch tube 3. Fluids may further be analyzed for their combined carbonates, sulphates and dissolved carbon-dioxide content by the utilization of barium-hydroxide as a re-agent.

A source of light 5 is disposed adjacent to the tube 1, and the radiations therefrom are collimated by a suitably-disposed lens 7. The collimated beam is sub-divided into a plurality of beams by a plurality of prisms 9 and 11. The beams are transmitted through the arms 13 and 15 of the tube 1 in a direction transverse to the fluid and at such relative locations that the re-agent is introduced between them. It is seen then that one beam is transmitted through a stream of fluid unaffected by the re-agent while the remaining beam is transmitted through the same stream of fluid modified by the re-agent.

When a color modification is introduced into the fluid by the presence of the re-agent, the light beams transmitted through the fluid are filtered. This object is most simply accomplished by utilizing plates 16 of transparent material having a suitable color.

The light beams impinge on a plurality of photo-sensitive devices 17 and 19 connected in the arms 21 and 23 of balanced network 25, such as a Wheatstone bridge. A power-supply source 27 is connected between two conjugate terminals 29 and 31 of the bridge 25, and a detecting device 33 is connected between the remaining terminals 35 and 37 of the bridge.

The detecting device 33 is, of course, of a character consistent with the power-supply source 27. For example, if a system of modulated high frequency is utilized as the source of supply of power 27, the detecting device 33 may be a system comprising a detector, an amplifier and a signalling device.

The power-supply source may also be an ordinary battery or a generator, in which case, the detecting device may be a simple meter or a recording instrument of a requisite type. The latter modification is particularly useful when the history of changes in the chemical or physical composition of the fluid is desirable.

It is seen that the balanced system 25 responds to the differential effect introduced by the modified light beams into the photo-sensitive devices, and, consequently, the fluid is explored relative to the constituents affected by the introduced re-agent and only these constituents. The effects of the remaining constituents or the beam of light are balanced out in the two arms 21 and 23 of the bridge.

If the fluid entering the tube 1 is rendered turbid or colored by constituents in which there is no interest, this turbidity or color, even if varying with time, does not affect the readings of the indicators that are adapted to yield the results of the analysis.

Requisite impedances 39 and 41 are provided in the branches of the balanced network. Certain of these impedances 39 are varied when the system is adjusted for operation. Before the fluid is analyzed, the network is balanced by transmitting the unmodified fluid through the tube, transmitting the light beams through the fluid, and balancing the system with the impedances 39.

Figure 2:
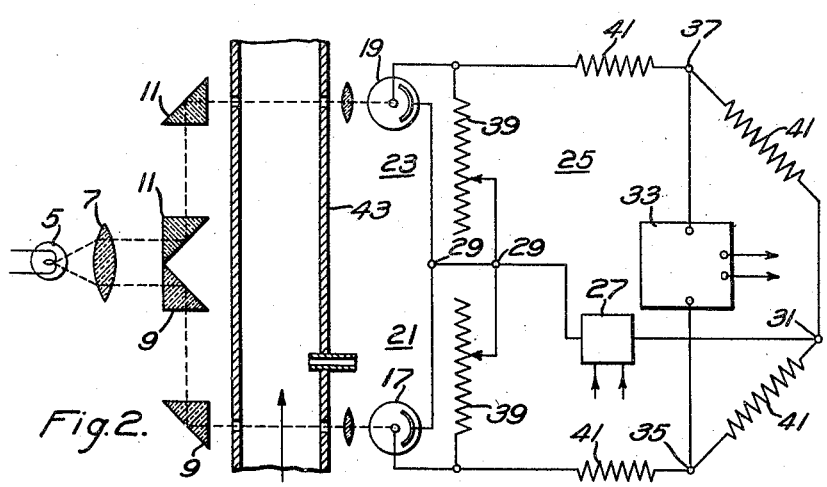
Fig. 2 is a schematic view, illustrating a modified embodiment of my invention.

In Fig. 2, a system is illustrated that is particularly usable with gases. In the analysis of gases, the content of such substances as hydrogen chloride or water vapor is often in question. As is illustrated in Fig. 2, the gas is transmitted longitudinally through a tube 43, and an optical system is provided for transmitting a plurality of beams transversely through the tube. A re-agent, ammonia for hydrogen chloride gas and phosphorus-pentachloride for water vapor, is introduced between the paths of the light beams. The fumes produced, on the one hand, by the ammonium-chloride, and on the other hand, by the phosphoric acid, affect the light beam traversing the path of the modified fluid, and the differential energy content of the beam transmitted through the modified fluid and through the unmodified fluid is measured on a bridge system 25 similar to the system of the type illustrated in Fig. 1.

Figure 3:
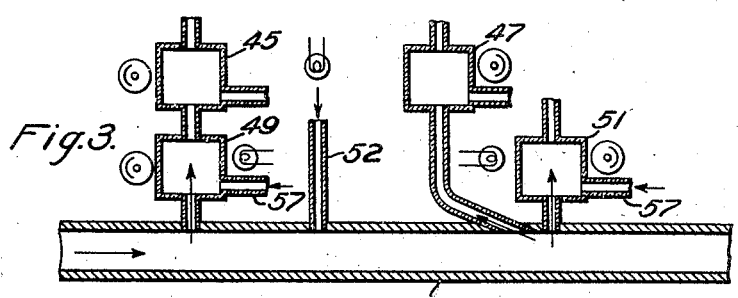
Fig. 3 is a schematic view showing how my invention may be applied to the complete analysis of a water-treating system.

The apparatus illustrated in Fig. 3 comprises a complete system constructed and operated according to my invention and particularly adapted to be utilized in the continuous analysis of water at a water-treating plant.

The water flows through the conduit 44 in the direction indicated by the arrows and is tapped off in a plurality of branches equipped with treating containers 45 and 47 and 49 and 51. A substance, such as chlorine, capable of destroying organic matter, is introduced into the conduit through a branch 52.

The containers 45 and 47 and 49 and 51 may be subdivided into pairs, as indicated above. Each pair of containers is adapted to the analysis of the water relative to certain predetermined properties thereof.

Thus, in one pair of containers 45 and 47, the water is analyzed for the variation in its content of organic matter before and after treatment with free chlorine. In a second group of containers 49 and 51, the water is analyzed for its content of chlorine before the introduction thereof into the system, after it has reacted with the organic matter for a suitable period of time.

In analyzing for chlorine, some re-agent, such as ortho-toluidine, is introduced into the containers through branch arm 57 in the requisite containers 49 and 51. In reacting with the free chlorine in the fluid, the ortho-toluidine produces a yellowish-green color therein. Hence, in applying the apparatus to the detection of chlorine, it is desirable that a yellowish-green filter of requisite type be incorporated in the system.

It is seen that, by utilization of a system such as is illustrated in Fig. 3 and by incorporating a suitable recording device 33 in the balanced network 25, a complete history of the condition of the water in the plant may be obtained in a comparatively simple and inexpensive manner.

If desirable, the balanced systems utilized in determining the constituents of the water may be so adjusted that, when an excess of organic matter is present after the treatment with chlorine, additional chlorine is automatically added. In this manner, the system may be automatically regulated to maintain any desirable condition.

It is to be noted that the analyzing system, while responsive to changes in organic matter, is unresponsive to changes in color or turbidity in the water supply.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. The method of determining the chemical composition of a gaseous substance relative to predetermined constituents with apparatus of a type including a balanced network, having a plurality of photo-sensitive devices connected in the arms thereof and a source of radiant energy adapted to excite said devices comprising the steps of causing said substance to flow in a predetermined path, subjecting said photo-sensitive devices in one of said arms to the radiations from said source affected by the unmodified substance, subjecting said substance to the action of a reagent adapted to produce with said constituents a fuming substance to be projected by said gaseous substance along the path thereof, subjecting the photo-sensitive devices in the remaining arm of said balanced network to the radiations affected by the mixture of said gaseous substance and said fuming substance and observing the degree of unbalanced condition produced in said balanced network.

2. The method of determining the quantity of hydrochloric gas combined in a gaseous substance with apparatus of a type including a plurality of photo-sensitive devices connected in a balanced network and radiant means for exciting said devices comprising the steps of causing said gaseous substance to move along a predetermined path, subjecting certain of said photo-sensitive devices to the radiations affected by said unmodified substance, introducing a predetermined quantity of ammonia gas into said substance, subjecting the remainder of said photo-sensitive devices to the radiations affected by the substance modified by the presence of the ammonium-chloride fumes therein and observing the degree of unbalancing in said circuit.

3. The method of determining the chemical composition of gaseous substance relative to predetermined constituents with apparatus of a type including a source of radiant energy comprising the steps of causing said gaseous substance to move along a predetermined path, transmitting a beam of radiant energy from said source through the unmodified substance, subjecting said substance to a re-agent adapted to produce a fuming substance with said constituents, transmitting a second beam of radiant energy from said source through the mixture of said gaseous substance and said fuming substance and observing the differential effect of the absorption on said radiant beams.

4. The method of determining the quantity of water vapor combined in a gaseous substance with apparatus of a type including a plurality of photo-sensitive devices connected in a balanced network and radiant means for exciting said devices comprising the steps of causing said gaseous substance to move along a predetermined path, subjecting certain of said photo-sensitive devices to the radiations affected by said unmodified substance, introducing a predetermined quantity of phosphorous-pentachloride into said substance, subjecting the remainder of said photo-sensitive devices to the radiations affected by the fluid modified by the presence of the fumes produced by the reaction of the phosphorous-pentachloride and the water vapor therein and observing the degree of unbalancing in said circuit.

CHARLES A. STYER.